United States Patent
Westerkamp et al.

(10) Patent No.: US 10,411,952 B2
(45) Date of Patent: Sep. 10, 2019

(54) AUTOMATIC LOCALIZATION OF A PHYSICAL NETWORK FAULT AT RUNTIME

(71) Applicant: WAGO Verwaltungsgesellschaft mbH, Minden (DE)

(72) Inventors: Georg Westerkamp, Garrel (DE); Lars Friedrich, Minden (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 79 days.

(21) Appl. No.: 15/479,625

(22) Filed: Apr. 5, 2017

(65) Prior Publication Data
US 2017/0288954 A1 Oct. 5, 2017

(30) Foreign Application Priority Data
Apr. 5, 2016 (DE) .................. 10 2016 004 095

(51) Int. Cl.
*H04L 12/26* (2006.01)
*H04L 12/24* (2006.01)

(52) U.S. Cl.
CPC ...... *H04L 41/0677* (2013.01); *H04L 41/0645* (2013.01)

(58) Field of Classification Search
CPC . H04J 3/14; H04L 43/50; H04L 43/00; H04L 1/00; H04B 10/0771
See application file for complete search history.

(56) References Cited

U.S. PATENT DOCUMENTS

| | | | | |
|---|---|---|---|---|
| 4,390,947 A * | 6/1983 | Deshon | ............... | H04L 25/0262 703/25 |
| 5,390,351 A * | 2/1995 | Di Giulio | .......... | G05B 19/0421 709/225 |
| 6,631,520 B1 * | 10/2003 | Theron | ..................... | G06F 8/65 712/E9.007 |
| 2001/0043568 A1 * | 11/2001 | McHale | .............. | H04L 12/2856 370/254 |
| 2002/0118733 A1 * | 8/2002 | Frenkel | ............... | H04L 27/2608 375/219 |

(Continued)

FOREIGN PATENT DOCUMENTS

EP 0455442 A2 * 11/1991 .......... G06F 11/2205

*Primary Examiner* — Siren Wei
(74) *Attorney, Agent, or Firm* — Muncy, Geissler, Olds & Lowe, P.C.

(57) ABSTRACT

A method is provided for localizing a physical network fault in a network having a plurality of network participants. The method comprises detecting by a first network participant and a second network participant that communication with a third network participant and the respective further participant of the first and second network participants is disrupted. In response to the detecting, the first network participant and second network participant automatically reduce their baud rate. The method comprises further establishing a connection between the first network participant and second network participant with use of the reduced baud rate, detecting by the first network participant and/or the second network participant that communication with the third network participant is not possible with use of the reduced baud rate, and storing information on the impossibility of communication with the third network participant.

18 Claims, 4 Drawing Sheets

(56) References Cited

U.S. PATENT DOCUMENTS

| | | | |
|---|---|---|---|
| 2003/0016694 A1* | 1/2003 | Schneider | H04L 12/2856 370/463 |
| 2004/0218591 A1* | 11/2004 | Ogawa | H04L 12/4625 370/364 |
| 2006/0049249 A1* | 3/2006 | Sullivan | G06K 7/0008 235/385 |
| 2006/0182439 A1* | 8/2006 | Hernandez | H04B 10/00 398/9 |
| 2016/0330044 A1* | 11/2016 | Andrews | H04L 12/4013 |

* cited by examiner

AUTOMATIC LOCALIZATION OF A PHYSICAL NETWORK FAULT AT RUNTIME

This nonprovisional application claims priority under 35 U.S.C. § 119(a) to German Patent Application No. 10 2016 004 095.5, which was filed in Germany on Apr. 5, 2016, and which is herein incorporated by reference.

BACKGROUND OF THE INVENTION

Field of the Invention

The present invention relates to the field of networks. In particular, the present invention relates to the field of the automatic localization of a physical network fault at runtime.

SUMMARY OF THE INVENTION

The present invention proposes a method for the automatic localization of a physical network fault (i.e., located at the lowest layer of the OSI model), for example, an interrupted electrical line or a short circuit, at runtime in a wired network having a plurality of network participants, devices configured to carry out the method (network participants), and a network configured to carry out the method.

The method of the invention for localizing a physical network fault in a wired network, having a plurality of network participants, comprises detecting by a first network participant whether communication with a second network participant and a third network participant is disrupted, detecting by the second network participant whether communication with the first network participant and the third network participant is disrupted, and depending on the detecting, automatically reducing a baud rate with which the first network participant transmits data to the second and third network participants and with which the second network participant transmits data to the first and third network participants, establishing a connection between the first network participant and the second network participant with use of the reduced baud rate, detecting by the first network participant and/or the second network participant that communication with the third network participant is not possible with the use of the reduced baud rate, and storing information on the impossibility of communication with the third network participant.

The method of the invention by reducing the baud rate makes it possible to restore communication with network participants, adversely affected by the physical network fault. In this regard, a distinction can be made in many cases between network connections, directly affected by the physical network fault (for example, by a disconnection resulting from an interrupted electrical line), and network connections, only indirectly affected by the physical network fault (for example, by reflections at the site of the line interruption). The location of the physical network fault can be pinpointed by the distinction between directly and indirectly affected network connections, because the directly affected network connections primarily come into question with respect to the physical network fault. As a result, the physical network fault can be pinpointed locally (on the directly affected network connections). Further, if a fault is present, the physical network fault can be pinpointed further (locally) by determining shared parts of all directly affected network connections.

The method comprises further transmitting a signal from one of the first and second network participants to the third network participant and measuring a time interval until a reflection of the signal is received.

The interval between the signal-transmitting network participant and the physical network fault can be calculated by determining the signal transit time, so that the physical network fault can be pinpointed still further (locally).

The automatic reduction of the baud rate can comprise reducing the baud rate of the first network participant and the second network participant by a predefined first factor, detecting by the first network participant and the second network participant that communication with the third network participant and the respective other participant of the first and second network participants is still disrupted, and, in response to the detecting, reducing the baud rate of the first network participant and second network participant by a second predefined factor.

A degree of involvement of the indirectly affected network connections can be determined by the stepwise reduction of the baud rate, as a result of which the physical network fault can be pinpointed still further (locally), because it can be assumed that the degree of involvement correlates with the proximity to the physical network fault.

The method comprises further establishing a connection between the first network participant and a fourth network participant with use of the baud rate, reduced by the predefined first factor, and storing information on the established connection with the fourth network participant with use of the baud rate, reduced by the predefined first factor.

It can be prevented further by the stepwise reduction of the baud rate that indirectly affected network connections are mistaken for directly affected network connections, as a result of which erroneous interpretations can be prevented.

The method comprises further storing, for each of a plurality of reduced baud rates, information on the communication, possible with use of the reduced baud rate, with network participants and displaying a reachability of the network participants in a topological network view based on the stored information.

The phrase "displaying a reachability of the network participants in a topological network view" in this case can be understood to mean in particular a graphical representation in which directly affected network connections and indirectly affected network connections are displayed differently. The displaying of the reachability of the network participants in the topological network view for this reason allows localizing the physical network fault in particular in the network view.

The device of the invention for localizing a physical network fault in a network, having a plurality of network participants, comprises a communication module, whereby the communication module is configured to detect whether communication with at least one of a plurality of network participants is disrupted and, if the communication with at least one of the plurality of network participants is disrupted, to check the reachability of the network participants with use of a reduced baud rate, whereby the device is configured to provide information on the reachability of the network participants with use of the reduced baud rate to an analysis unit.

As stated above, the reduction of the baud rate enables restoration of communication with network participants adversely affected (for example, by reflections) by the physical network fault (for example, an interrupted electrical line or short circuit), as a result of which network connections directly and indirectly affected by the physical network fault can be differentiated and the physical network fault can be pinpointed (locally) thereby. In this regard, the term "reachability" can be understood to mean the ability to make a connection in general and in particular the ability to make a connection via which data can be transmitted without data loss or substantially without data loss.

The communication module can be configured to transmit a signal to an unreachable network participant and to measure a time interval until a reflection of the signal is received.

As stated above, the interval between the signal-transmitting network participant and the physical network fault can be calculated by measuring the signal transit time, so that the physical network fault can be pinpointed further (locally).

The communication module can be configured further to reduce the baud rate in steps and to check the reachability of the network participants with use of various reduced baud rates.

As stated above, the stepwise reduction of the baud rate can reduce further the risk that indirectly affected network connections are regarded as directly affected network connections, as a result of which erroneous interpretations can be prevented.

The communication module can be configured further, for each of the various reduced baud rates, to send information on the reachability of the network participants to the analysis unit.

This enables a central evaluation of the indications.

The network of the invention comprises a plurality of devices of the invention and an analysis unit, whereby the analysis unit is configured to receive information on the reachability of the devices from each of the plurality of devices and, based on the information, to localize a physical network fault.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
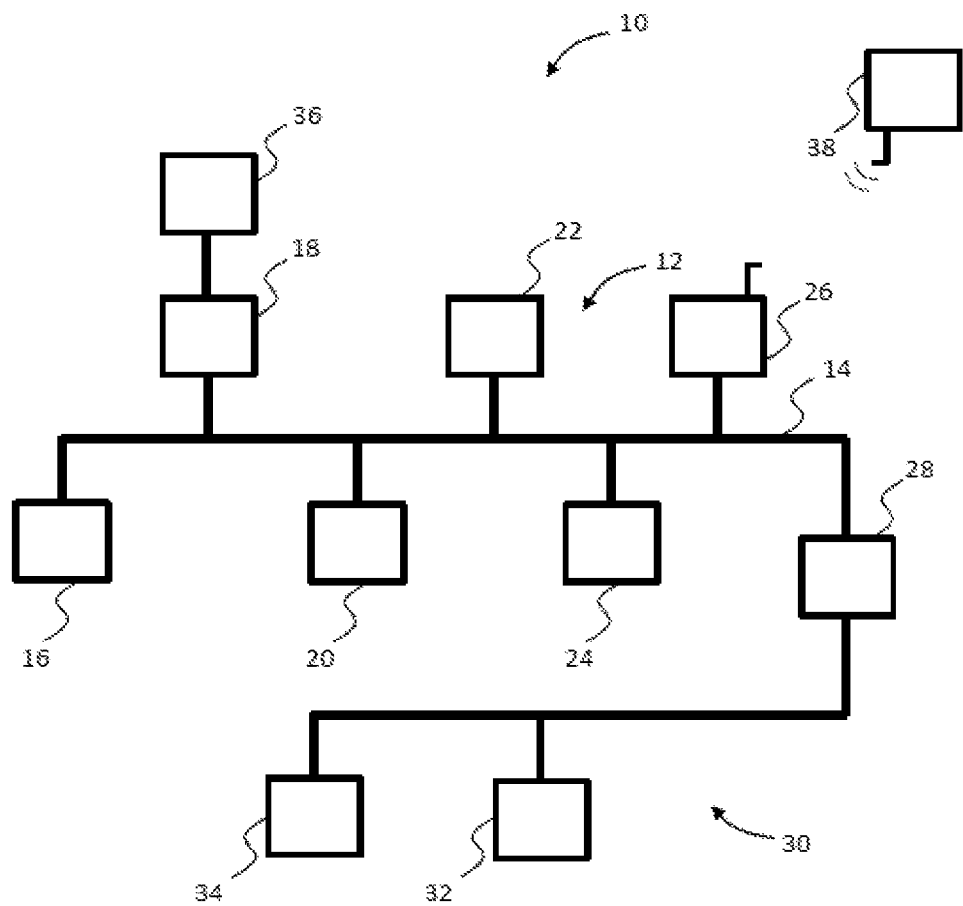
FIG. 1 shows a schematic view of a network environment, comprising a BACnet MS/TP bus system.

FIG. 1 shows a schematic view of a network environment 10, comprising a BACnet MS/TP bus system 12. BACnet MS/TP bus system 12 comprises a bus line 14 (two-wire bus) to which a plurality of bus participants 16-28 are connected. Bus participants 16-28 in operation are divided into master bus participants 16, 22, and 28 and slave bus participants 18 and 26. Further, one or more bus participants 20 and 24, which are provided to be integrated as master bus participants into the token rotation among master bus participants 16, 22, and 28, can be connected (physically) to the bus line. Before bus participants 20 and 24 are integrated as master bus participants into the token rotation, however, they are only authorized to respond to queries from master bus participants 16, 22, and 28. In contrast, they are not authorized, without responding to a query from a master bus participant 16, 22, or 28, to transmit messages to the other bus participants 16, 18, 22, 26, and 28 via the bus, i.e., with use of bus line 14. Bus participants 20 and 24 to be integrated into the token rotation are therefore the same as slave bus participants 18 and 26, but they differ from these, because they are configured to be integrated into the token rotation of the BACnet MS/TP bus system 12 as master bus participants at runtime.

Bus participants 16-28 can be freely programmable and be configured in particular to implement one or more building automation applications, i.e., to store instructions the execution of which at runtime provides or supports one or more automation applications in one or more buildings or in one or more rooms of a building. For example, master bus participant 16 can implement a first building automation control and master bus participant 22 a second building automation control. The first building automation control can be, for example, a heating and ventilation control, which controls the heating and cooling elements in a room of a building and a branch of a ventilation unit of the building, which supplies the room with fresh air and removes exhaust air. The second building automation control can be a light control, for example, which controls lighting elements in the room.

Master bus participant 28 further can implement a router, which connects BACnet MS/TP bus system 12 to a network 30. Network 30 can be, for example, a further building automation network, in particular a further BACnet MS/TP network, a BACnet PTP network, a BACnet ARCNET network, a BACnet/LonTalk network, a BACnet/ZigBee network, a BACnet Ethernet network, or a BACnet/IP network. Network 30 furthermore can comprise a (central) building control device 32, which enables monitoring and/or configuration of bus participants 16-28. Building control device 32 can store and/or retrieve in particular one or more (dynamic) HTML pages, via which parameters of bus participant 16-28 can be retrieved and optionally set. Furthermore, building control device 32 can be a portable computer, which is temporarily connected via the router to BACnet MS/TP bus system 12, for example, for the purposes of configuration or maintenance. Further, the further network 30 can comprise a further router 34, which is configured to connect central building control device 32 to a LAN (Local Area Network), a WAN (Wide Area Network), or the Internet. In particular in the case that building control device 32 is a portable computer, the further router 34 can be reached via a wireless interface.

Slave bus participants 18 and 26 can be configured to provide data to master bus participants 16, 22, and 28. For example, slave bus participants 18 and 26 can implement measuring devices, whose measured values can be queried by master bus participants 16, 22, and 28 cyclically or acyclically. For example, slave bus participant 18 can implement a temperature measuring device, which measures temperature data in regard to a room by means of a temperature sensor 36, coupled to the temperature measuring device and located in the room, and makes these available to the first building automation control. Slave bus participant 26 moreover can comprise a receiver module which is configured to receive signals wirelessly from a sensor 38. Sensor 38 can be a motion sensor, for example, which detects whether there are persons in the room. Alternatively, sensor 38 can be, for example, a sensor that detects whether a window or a door of the room is open. The data collected by slave bus participant 26 can be made available to the first building automation control and optionally the second building automation control.

Bus participant 20, to be integrated as a master bus participant in the token rotation occurring among master bus participants 16, 22, and 28, can be configured to support a building automation control implemented by master bus participants 16 and 22 or to implement a third building automation control. For example, bus participant 20 can implement a further light control that is provided to control further light elements in the room. Bus participant 24, to be integrated as a master bus participant in the token rotation occurring among master bus participants 16, 22, and 28, can also be configured to support a building automation control implemented by master bus participants 16 and 22 or to implement a fourth building automation control. For example, bus participant 24 can implement a control that is configured to control shading elements. The shading elements can be provided in particular to limit the incidence of daylight in the room.

Figure 2:
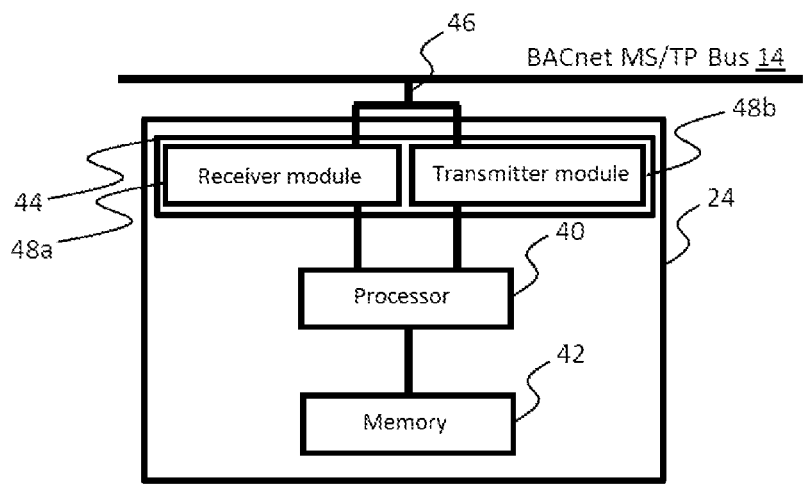
FIG. 2 shows a schematic view of a bus participant in the BACnet MS/TP bus system.

As shown in FIG. 2, bus participant 24 comprises a processor 40, a nonvolatile memory 42 coupled to processor 40, which is configured to store data and machine-readable instructions, and a communication module 44, which is configured to access an interface 46, which is in electrical contact with bus line 14. Interface 46 can be, for example, an RS-485 interface. Communication module 44 can comprise a receiver module 48a and a transmitter module 48b. Receiver module 48a can be configured to receive signals transmitted via bus line 14 and to provide them to processor 40. Transmitter module 48b can be configured to transmit signals via bus line 14 to bus participants 16-22, 26, and 28 (connected to the bus line).

Receiver module 48a and transmitter module 48b can be configured to enable parallel writing of data to the bus and reading of data from the bus. In particular, receiver module 48a can be configured to detect a voltage level on bus line 14, whereas transmitter module 48b changes the voltage level on bus line 14 or attempts to actively influence the voltage level. The presence of receiver and transmitter modules 44 and 46, operable in parallel, makes it possible for bus participant 24 in particular to check whether the data it transmitted via the bus are faulty or whether a plurality of bus participants 16-28 simultaneously transmitted different data via the bus.

Bus participant 20, like bus participant 24, can comprise a communication module 44 with receiver and transmitter modules 48a and 48b, operable in parallel, and thereby be capable of writing data to the bus and simultaneously reading data from the bus. Further, master bus participants 16, 22, and 28 can also be configured to write data to the bus in a parallel manner and simultaneously to read data from the bus. Alternatively, bus participant 20 can comprise a communication module with receiver and transmitter modules that are operable consecutively and are configured alternately either to write data to the bus or to read data from the bus. Further, master bus participants 16, 22, and 28 can also be configured alternatively either to write data to the bus or to read data from the bus.

Figure 3:
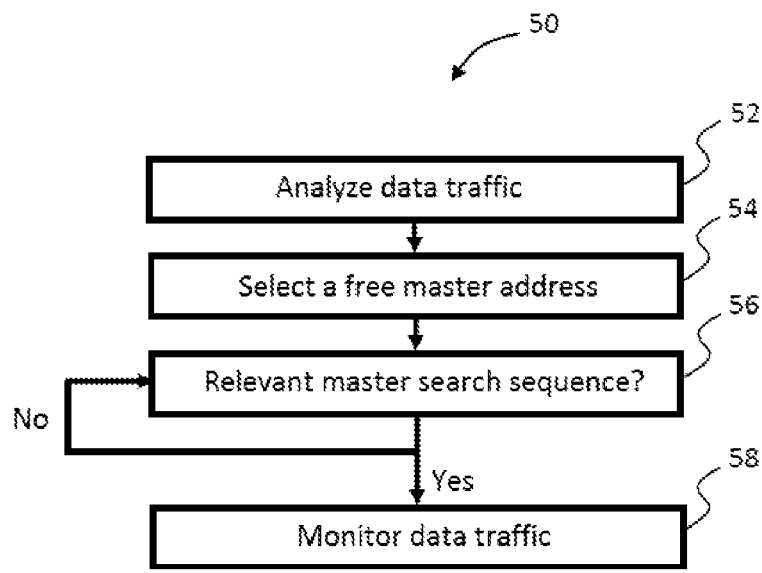
FIG. 3 shows a flowchart of a process for the automatic assignment of master addresses in the BACnet MS/TP bus system.

Memory 42 of bus participant 24 furthermore can comprise instructions to program bus participant 24 during the execution of the instructions to select a master address automatically and to strive for inclusion in the bus as a master bus participant. Process 50, initiated by the instructions stored in memory 42, for the automatic setting of a master address is shown in FIG. 3 in the form of a flowchart. Process 50 begins with process step 52, which comprises the analysis of data traffic on bus line 14. For example, the monitored data traffic can be analyzed continuously with respect to occupied master addresses. The analysis in this regard can extend over one or more communication rounds, whereby a communication round comprises a completely rotation of the token over all master addresses assigned at this time (also called token rotation herein). The analysis makes it possible for bus participant 24, striving to be integrated into the token rotation, to determine which master addresses are assigned and which master addresses are still free.

In process step 54 bus participant 24, striving to be integrated into the token rotation, selects an unoccupied preliminary master address, so as to claim it in the next corresponding master search sequence and to be integrated into the bus as a master bus participant. To prevent that the selected master address is in fact free but is in an address range that is not to be used, bus participant 24 can be programmed to select an unoccupied master address that is smaller than the (numerically) highest used master address or is greater by one than the (numerically) highest used master address. If a number of unoccupied master addresses are available that are smaller than the (numerically) highest used master address, the preliminary master address can be selected by a random function. The random function can use as a parameter a unique device address of bus participant 24 or a time of the activation of bus participant 24.

In process steps 56, the start of the next relevant master search sequence is awaited, i.e., the master search sequence that queries the master address, selected by bus participant 24 striving to be integrated into the token rotation, in regard to bus participants desiring to join the bus system. A relevant master search sequence, therefore, is a master search sequence which is initiated by a master bus participant whose master address from the set of the assigned master addresses is closest to the selected master address in the downwards direction (numerically), for example, master bus participant 28, and in which the inquiry is made about bus participants that claim the selected master address for themselves. In the case that there are a plurality of free master addresses between the assigned master address, closest to the selected master address in the downwards direction (numerically), and the assigned master address, closest to the selected master address in the upwards direction (numerically), the master search sequence can be divided into a number of parts, namely, when no bus participant claims the first queried master address for itself and the master bus participant initiating the master search sequence successively searches one or more further master addresses, until a free master address is (successfully) claimed by a bus participant, or the address space to be searched was unsuccessfully searched, and the master search sequence is ended.

After the start of the next relevant master search sequence is determined, process 50 is continued with process step 58, which comprises the monitoring of the data traffic during a reply phase of the master search sequence with respect to the bus participants responding to the master search sequence. In this regard, a number of different circumstances can occur. If bus participant 24 is the only bus participant, claiming the selected master address for itself in the reply phase, thus in the monitoring of the data traffic during the reply phase no (reply) activities of other bus participant, for example, bus participants 16-22 and 26, are noted and accordingly a conflict-free assignment of the selected master address is assumed. Because the thereby successfully assigned master address from now on is no longer queried in any master search sequence, no other bus participant can also successfully claim it for itself.

If apart from bus participant 24 there still are one or more other bus participants, such as, for example, bus participant 20, which in the reply phase claims the selected master address for itself, bus participant 24 can be configured to recognize the latent address conflict case arising therefrom and to resolve it if possible. For example, bus participant 24 can be configured to cancel a planned reply to the master search sequence, if during monitoring of the data traffic it is determined during the reply phase by analyzing the data traffic that a further bus participant, for example, bus participant 20, claims the selected master address for itself.

Further, bus participant 24 striving for integration into the token rotation can be configured to terminate an already started reply to the master search sequence, if during monitoring of the data traffic it is determined during the reply to the master search sequence by analyzing the data traffic that a further bus participant, such as, for example, bus participant 20, claims the selected master address for itself. If further bus participant 20 is capable of writing data to the bus and simultaneously to read data from the bus, further bus participant 20 can also be configured further to terminate an already started reply to the master search sequence, if during the monitoring of the data traffic it is determined during the reply to the master search sequence by analyzing the data traffic that bus participant 24 claims the selected master address for itself. Because in this case both bus participants, or in the case of a plurality of similarly programmed and acting bus participants, these terminate the started reply to the master search sequence, it can occur that the master address is not assigned in the current master search sequence.

To prevent the similarly programmed and acting bus participants from continuing to interfere or from interfering in the following master search sequences, some or all of the bus participants can be configured to select different time intervals after which they repeat the replying to the master search sequence. For example, bus participant 24, striving for integration into the token rotation, can be configured to determine a time interval after which replying to the master search sequence or subsequent master search sequences can occur by a random process or an indicator randomly assigned to bus participant 24. The random process can be based, for example, on parameters that are determined at runtime and the granularity of which is great enough to result in different time intervals with a high probability, for example, in more than 99.99% of the arising cases. Similarly, further bus participant 20 or, in the case of a plurality of further bus participants, all other bus participants can be configured to determine a time interval, after which replying to the master search sequence or subsequent master search sequences can occur, by a random method or an indicator or indicators randomly assigned to further bus participant 20 or to the plurality of further bus participants, whereby, for example, all randomly assigned indicators are different and thereby unique.

Further, bus participant 24 can be configured not to set the selected master address and instead to select an alternative master address, if during the monitoring of data traffic it is determined during the reply phase of the master search sequence by analyzing the data traffic that further bus participant 20 also claims said master address for itself, although bus participant 24 had already claimed the master address for itself; i.e., the replying to the query has been completed. Further, bus participant 24, striving for integration into the token rotation, can be configured not to use a set master address and instead to select an alternative master address, if during the (continuous) monitoring of the data traffic it is determined after the end of the reply phase of the master search sequence by analyzing the data traffic that further bus participant 20 uses the master address of bus participant 24. It is made possible thereby to prevent or resolve address conflicts, even if further bus participant 20 is not capable of writing data to the bus and simultaneously reading data from the bus and therefore cannot recognize the latent address conflict.

Figure 4:
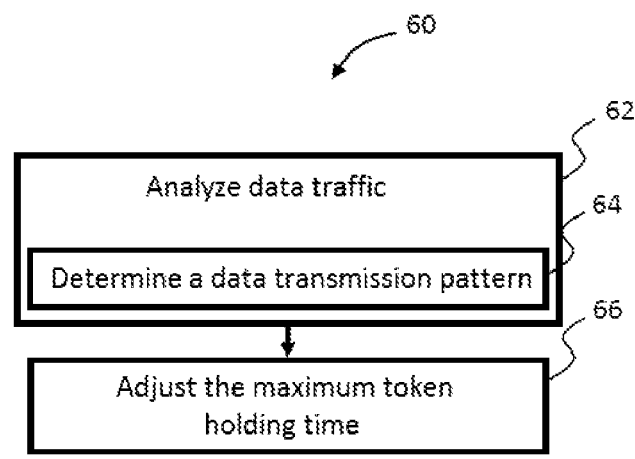
FIG. 4 shows a flowchart of a process for the automatic adjustment of the maximum token holding time of a bus participant in the BACnet MS/TP bus system.

Memory 42 of bus participant 24 can comprise furthermore instructions that program bus participant 24 during the execution of the instructions to automatically adjust the maximum token holding time. Process 60, initiated by the instructions stored in memory 42, for the automatic adjustment of a maximum token holding time is shown in FIG. 4 in the form of a flowchart. Process 60 begins with process step 62, which comprises analyzing the data traffic in BACnet MS/TP bus system 12. For example, the data traffic can be analyzed during two, three, four, five, or n token rotations (with n being greater than 5). The analysis can be focused on determining whether master bus participants 16, 22, and 28 in each token rotation send (useful) data, i.e., data going beyond the bus communication stipulated by the BACnet MS/TP protocol, or whether there is one or more token rotations in which a bus participant sends no (useful) data. Further, the analysis can be focused on determining whether one, several, or all of the master bus participants 16, 22, and 28 in each token rotation send (virtually) the same amount of (useful) data via the bus, or whether the amount of (useful) data in the token rotations varies around an average (by more than a predefined deviation factor).

Furthermore, the analysis can be focused on determining which building automation application(s) or which type(s) of building automation application(s) master bus participants 16, 22, and 28 are implementing. To this end, for example, bus participant 24 can be configured to query master bus participants 16, 22, and 28 about the building automation application(s) implemented by them. Moreover, the analysis can be focused on determining how time critical the building automation application(s) implemented by master bus participants 16, 22, and 28 is/are. In this case, this information can be queried directly from master bus participants 16, 22, and 28 or can be estimated in regard to the type(s) of the implemented building automation application(s). For example, bus participant 24 can store information that permits assigning maximum token rotation times to a plurality of building automation application types.

In process step 64, the analysis with the determination of a data transmission pattern of at least one of master bus participants 16, 22, and 28 is continued. Regarded as a data transmission pattern in this regard is in particular a data transmission behavior from which conclusions can be drawn on a future data transmission behavior. If the data transmission behavior comprises a cyclic component, for example, transmission of the same data amount in each second, third, fourth, fifth, or n-th token rotation (with n being greater than 5), this can be interpreted as part of a data transmission pattern such that the same data amount is transmitted in the future as well in each second, third, fourth, fifth, or n-th token rotation. The data transmission pattern is therefore based on rules which are obtained by analyzing the data traffic and from which a future data transmission behavior can be deduced. A cyclic behavior of master bus participant 16 can be determined, for example, by a Fourier analysis of the data traffic filtered by master bus participant 16.

In process step 66, the maximum token holding time of bus participant 24 is adjusted based on the data traffic analysis. If, for example, all or a plurality of master bus participants 16, 22, and 28 transmit (useful) data only in each second, third, fourth, fifth, or n-th token rotation (with n being greater than 5), it can be concluded from this that an increase in the token rotation time will not affect or at most slightly affect these master bus participants 16, 22, and 28. If, in contrast, all or the plurality of master bus participants 16, 22, and 28 transmit in each token rotation, it can be concluded from this that an increase in the token rotation time will directly affect these master bus participants 16, 22, and 28. Bus participant 24 in this case can be configured further to undertake an increase in the maximum token holding time of bus participant 24 in particular only if the maximum (i.e., the maximum measured) send buffer usage of transmitter module 48b exceeds a predefined threshold value in the token rotations analyzed with respect to the data traffic.

It can be established further that a greater increase in the maximum token holding time can be made in the first case than in the second case. For example, it can be established that the increase in the first case is less than 10% or less than 5% of the maximum token holding time and in the second case is more than 10% or more than 20% of the maximum token holding time. Furthermore, bus participant 24 can be configured to reduce the maximum token holding time of bus participant 24 in the case in which the maximum send buffer usage of transmitter module 48b in the token rotations analyzed with respect to data traffic does not exceed a predefined threshold value or fall below another threshold value. Bus participant 24 can be configured further to reduce the maximum token holding time of bus participant 24 in this case, in particular only if a plurality or all of the master bus participants 16, 22, and 28 transmit (useful) data in all token rotations.

Process 60 can be repeated further iteratively, if the data traffic analysis reveals that the data transmission pattern of one or more of master bus participants 16, 22, and 28 changes structurally, for example, if the one master bus participant or the plurality of master bus participants 16, 22, and 28 transmits in additional token rotations or if the one master bus participant or the plurality of master bus participants 16, 22, and 28 transmits in fewer token rotations, whereby an increase or decrease in the maximum token holding time of bus participant 24 can be smaller in value from repetition to repetition in order to achieve a convergence of the maximum token holding time to a certain value. Further, a repetition of processes 60 can be related to the fact that master bus participants 16, 22, and 28 are removed from the bus or integrated into the bus. Moreover, the adjustment of the maximum token holding time of bus participant 24 can occur according to Fairness standpoints, whereby a transmission portion of bus participant 24 and optionally transmission portions of master bus participants 16, 22, and 28 are determined and the maximum token holding time of bus participant 24 is reduced, if the transmission portion of bus participant 24 exceeds a predefined threshold value, and the transmission portion of bus participant 24 is increased, if the transmission portion of bus participant 24 falls below a predefined threshold value, or if a comparison of the transmission portions of bus participant 24 and master bus participants 16, 22, and 28 reveals that the maximum token holding time of bus participant 24 deviates from the maximum token holding times of master bus participants 16, 22, and 28 in each case by more than a predetermined threshold value.

The degree of adjustment can be based further on the send buffer usage of transmitter module 48b in the token rotations analyzed with respect to data traffic. If, for example, the maximum send buffer usage of transmitter module 48b exceeds a predefined threshold value, such as, e.g., 80% or 90% of the maximum (i.e., the maximum possible) send buffer usage, thus bus participant 24 can be configured to strive for an increase in the maximum token holding time of bus participant 24, whereby it can be established that the increase is the greater, the more greatly the maximum send buffer usage of transmitter module 48b exceeds the predefined threshold value. If, in contrast, the maximum send buffer usage of transmitter module 48b falls below a predefined threshold value, such as, e.g., 20% or 10% of the maximum send buffer usage, thus bus participant 24 can be configured to strive for a reduction in the maximum token holding time of bus participant 24, whereby it can be established that the reduction is the greater, the more greatly the maximum send buffer usage of transmitter module 48b falls below the predefined threshold value.

Figure 5:
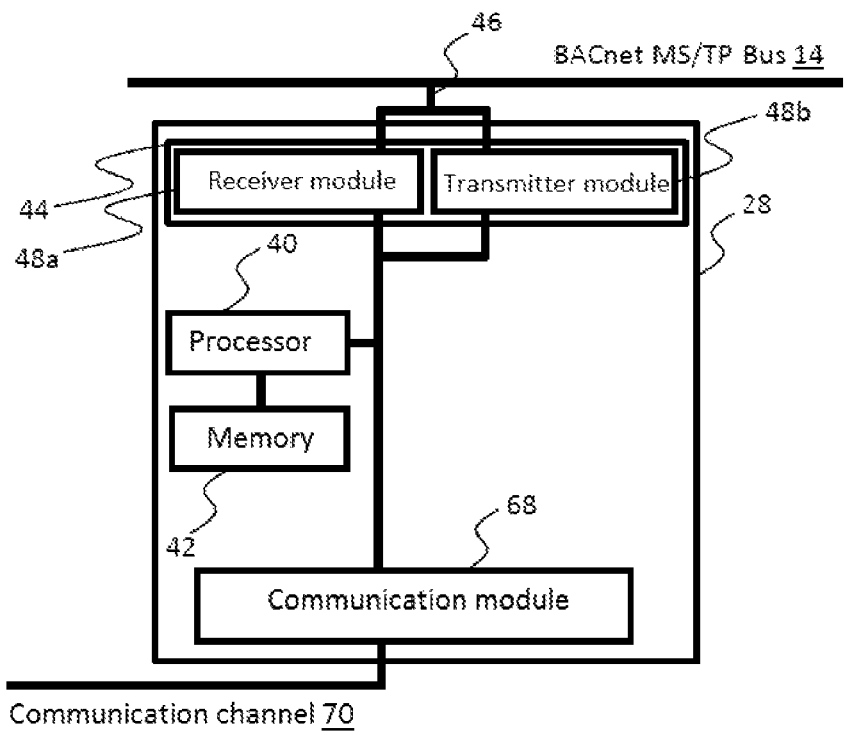
FIG. 5 shows a schematic view of a further bus participant in the BACnet MS/TP bus system.

FIG. 5 shows a schematic view of master bus participant 28 in an exemplary embodiment in which master bus participant 28 implements a router. As shown in FIG. 5, master bus participant 28 comprises a processor 40 and a nonvolatile memory 42, which is coupled to processor 40 and is configured to store data and machine-readable instructions. Nonvolatile memory 42 can store in particular instructions that program bus participant 28 in the execution of the instructions to implement processes 50 and 60 described in connection with FIGS. 3 and 4. Master bus participant 28 comprises further a communication module 44, which is configured to access a (physical) interface 46, which is in electrical contact with bus line 14. Interface 46 can be, for example, an RS-485 interface. Communication module 44 can comprise further receiver module 48a described in relation to FIG. 2 and transmitter module 48b described in relation to FIG. 2.

Master bus participant 28, moreover, can comprise a further communication module 68, which is configured to access a further (physical) interface which is in electrical contact with a communication channel 70. The further communication module 68 can be configured to receive signals transmitted via communication channel 70 (and to provide them to processor 40) and to transmit signals via communication channel 70. Furthermore, further communication module 68 can be configured to pass on the data, received via communication channel 70 connected to the interface, to communication module 44, which can be configured to transmit data received from further communication module 68 via interface 46. Furthermore, communication module 44 can be configured to pass on data, received via interface 46, to further communication module 68, which can be configured to transmit data, received from communication module 44, via the further interface. In this case, the router enables data communication between the BACnet MS/TP bus system 12 and network 30.

Figure 6:
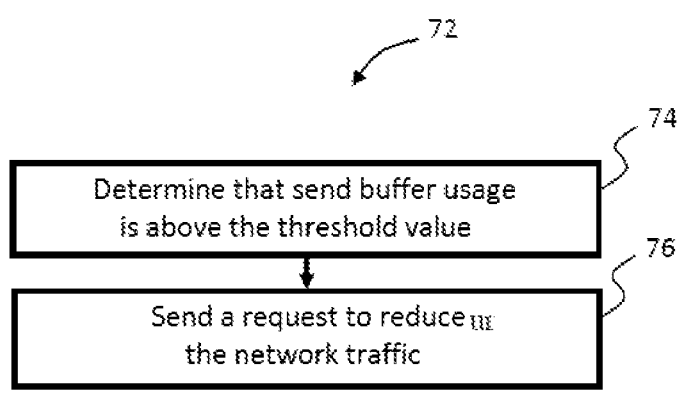
FIG. 6 shows a flowchart of a process for the automatic adjustment of the data traffic in the BACnet MS/TP bus system.

Memory 42 of master bus participant 28 furthermore can comprise instructions, which program master bus participant 28 in the execution of the instructions to initiate an automatic adjustment of the data traffic in the BACnet MS/TP bus system 12. Process 72, initiated by the instructions stored in memory 42, for the automatic adjustment of the data traffic is shown in FIG. 6 in the form of a flowchart. Process 72 begins with process step 74, in which master bus participant 28 during runtime determines that usage of the send buffer of the router, implemented in master bus participant 28, exceeds a predefined threshold value. After determining that the send buffer usage exceeds a predefined threshold value, process 72 is continued with process step 76 in which master bus participant 28 sends a message to at least one further master bus participant 16 and 22, whereby the message contains a request to reduce the amount of data sent via the BACnet MS/TP bus system 12. For example, master bus participant 28 can send a first message to the address of master bus participant 16 and a second message to the address of master bus participant 22. Alternatively, a master bus participant 16 and 28 or master bus participants 16 and 28 can be configured to check messages sent via the bus, even if they are not explicitly addressed to master bus participants 16 and 28, as to whether they contain a request to reduce the amount of data sent via the BACnet MS/TP bus system 12. For example, one of the master bus participants 16 and 28 or master bus participants 16 and 28 can be configured to check messages sent via the bus as to whether they contain a request to reduce the amount of data sent via the BACnet MS/TP bus system 12, if the messages are addressed to a predefined address.

The message can comprise an indicator of different priority levels. If the indicator is assigned, for example, to a first priority level, master bus participants 16 and 22 divide the data to be transmitted by them with respect to their priority and delay the transmission of lower priority data. If the indicator is assigned, for example, to a second higher priority level, master bus participants 16 and 22 suspend the transmission of lower priority data. If the indicator is assigned further, for example, to a third, still higher priority level, master bus participants 16 and 22 moreover suspend the transmission of useful data for a certain time period. If a token holding time flag is set in the message, master bus participants 16 and 22 reduce their maximum token holding time. If a baud rate increase flag is set in the message, master bus participants 16 and 22 increase their baud rate. If the indicator, in contrast, is assigned, for example, a fourth priority level, master bus participants 16 and 22 return to their normal (original) transmit state. Alternatively, the return to the normal transmit state can be triggered by the elapse of a time duration, whereby each priority level can be assigned a predefined time duration or a particular time duration can be contained in the message. The time duration in this case can begin with the receiving of the message and end when the time represented by the time duration has elapsed. Further, master bus participants 16 and 22 can be configured to resume the transmission of useful data on their own initiative, if the usage of their send buffer exceeds a predefined threshold value. Further, master bus participant 28 can be configured, furthermore, to lengthen its maximum token holding time. This is indicated in particular when the send buffer usage of master bus participant 28 cannot be reduced (permanently) to below a predefined threshold value by the automatic adjustment of data traffic, as described above, in the BACnet MS/TP bus system 12.

Figure 7:
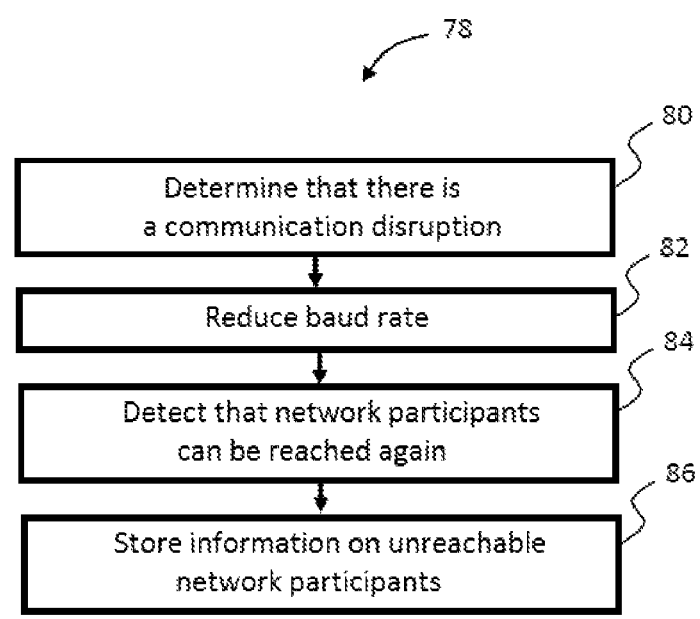
FIG. 7 shows a flowchart of a process for the automatic localization of a physical network fault.

Memory 42 of master bus participant 28, furthermore, can comprise instructions that program master bus participant 28 during the execution of the instructions to support a process 78 for localizing a physical network fault in network 30. Process 78, initiated by the instructions stored in memory 42, for localizing a physical network fault is shown in FIG. 7 in the form of a flowchart. Process 78 begins with process step 80, in which master bus participant 28 detects that a communication with building control device 32 and router 34 is disrupted. In process step 82, master bus participant 28 thereupon automatically reduces its baud rate. The susceptibility to failure of the communication is reduced by the baud rate reduction. In process step 84, master bus participant 28 detects that a connection can be established to a part of the network participants, namely, building control device 32. In process step 86, master bus participant 28 stores information in regard to network participants not reachable at the reduced baud rate, namely, further router 34.

Master bus participant 28, further, can be configured to reduce the baud rate stepwise and to try to establish a connection with further network participants 32 and 34 for each baud rate level, and to store for each baud rate information on the reachable network participants. In this case, each network participant starting from the beginning of a disruption can reduce its baud rate stepwise, whereby each network participant remains at each step for a predefined time and tries to establish a connection with all network participants, for example, by transmitting a broadcast message. Alternatively, instead of a stepwise reduction, the baud rate can be set to a minimum value and, if communication is again possible with at least some of the network participants, a request can be sent to these network participants to increase the baud rate stepwise, whereby each network participant is configured to store information on the baud rate at which communication breaks off with network participants with which a connection was still possible at a lower baud rate. Furthermore or alternatively, the information can contain a fault rate from which the degree of communication disruption to each network participant is evident.

Similarly, building control device 32 can be configured likewise to implement process 78. Further, building control device 32 can be configured to receive the information of master bus participant 28 on unreachable router 34 with use of the reduced baud rate. Further, building control device 32 can be configured to create a reachability chart based on the received and stored information. The reachability chart can show in particular graphically over which network connection and at which baud rate a connection between network participants was possible and thereby supports the localization of the physical network fault. For example, building control device 32 can comprise an analysis unit, which is configured to receive information on unreachable network participants from all network participants involved in the process and, for example, to represent this graphically in the form of a reachability chart for each baud rate.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A method for localizing a physical network fault in a wired network having a plurality of network participants, the method comprising:
  detecting by a first network participant whether communication with a second network participant and a third network participant is disrupted;

detecting by the second network participant whether communication with the first network participant and the third network participant is disrupted;

automatically reducing, based on said detecting by the first network participant and/or said detecting by the second network participant, a baud rate with which the first network participant transmits data to the second and third network participants and with which the second network participant transmits data to the first and third network participants;

establishing a connection between the first network participant and the second network participant with a reduced baud rate;

detecting by the first network participant and/or the second network participant that communication with the third network participant is not possible with the reduced baud rate; and storing information on the impossibility of communication with the third network participant.

2. The method according to claim 1, further comprising:
transmitting a signal from one of the first or second network participants to the third network participant; and
measuring a time interval until a reflection of the signal is received.

3. The method according to claim 1, wherein said automatically reducing the baud rate comprises:
reducing the baud rate of the first network participant and the second network participant by a predefined first factor;
detecting by the first network participant and the second network participant that communication with the third network participant and the respective other participant of the first and second network participants is still disrupted; and
in response to the detecting by the first network participant and/or the second network participant, reducing the baud rate of the first network participant and the second network participant by a second predefined factor.

4. The method according to claim 3, further comprising:
storing, for each baud rate of a plurality of reduced baud rates, information on possible communication with network participants with the reduced baud rate; and
displaying a reachability of the network participants in a topological network view based on the stored information.

5. A device for localizing a physical network fault in a network having a plurality of network participants, the device comprising:
a communication module, whereby the communication module is configured:
to detect whether communication with a first one of the plurality of network participants and a second one of the plurality of network participants is disrupted; and
if the communication with the first one of the plurality of network participants and the second one of the plurality of network participants is disrupted,
to transmit a broadcast message to reduce a baud rate of data transmitted by the first one of the plurality of network participants to the second one of the plurality of network participants and a third one of the plurality of network participants and to reduce a baud rate of data transmitted by the second one of the plurality of network participants to the first one of the plurality of network participants and the third one of the plurality of network participants, and
to check a reachability of the plurality of network participants with a reduced baud rate,
wherein the communication module is configured to provide information on the reachability of the plurality of network participants with the reduced baud rate to a controller.

6. The device according to claim 5, wherein the communication module is configured:
to transmit a signal to an unreachable network participant; and
to measure a time interval until a reflection of the signal is received.

7. The device according to claim 5, wherein the communication module is configured to reduce the baud rate in steps and to check the reachability of the plurality of network participants with various reduced baud rates.

8. The device according to claim 7, wherein the communication module is configured further, for each of the various reduced baud rates, to send information on the reachability of the plurality of network participants to the controller.

9. A network comprising:
a plurality of devices according to claim 5; and
the controller, wherein the controller is configured to receive information on the reachability of the plurality of devices from each of the plurality of devices and configured to, based on the information, localize the physical network fault.

10. The device according to claim 5, wherein the communication module is configured to increase the reduced baud rate of reachable network participants.

11. The network according to claim 9, wherein at least one of the plurality of devices is configured for a building automation control.

12. The network according to claim 11, wherein the building automation control is a heating and ventilation control of a room.

13. The network according to claim 11, wherein the at least one of the plurality of devices is configured to collect data from a temperature sensor.

14. The network according to claim 11, wherein the at least one of the plurality of devices is configured to collect data from a sensor for detecting whether a window or a door of the room is open.

15. The network according to claim 11, wherein the at least one of the plurality of devices is configured to collect data from a motion sensor.

16. The network according to claim 11, wherein the building automation control is a light control of a room.

17. The network according to claim 11, wherein the building automation control is a shading control of a room.

18. A network for localizing a physical network fault in the network, comprising:
a first network participant;
a second network participant coupled to the first network participant; and
a third network participant coupled to the first and second network participants,
wherein the first network participant automatically reduces a baud rate of data transmitted from the first network participant to the second network participant and the third network participant and the second network participant automatically reduces a baud rate of data transmitted from the second network participant to the first network participant and the third network participant when the first network participant detects a disruption of communication with the second network participant and the third network participant;

wherein the first network participant establishes connection with the second network participant with a reduced baud rate; and wherein the first network participant or the second network participant stores reachability information when the third network participant cannot be reached by the first network participant or the second network participant.

* * * * *